United States Patent
Kim et al.

(10) Patent No.: US 10,310,905 B2
(45) Date of Patent: Jun. 4, 2019

(54) METHOD AND APPARATUS FOR CONTROLLING A PLURALITY OF OPERATING SYSTEMS

(71) Applicant: Samsung Electronics Co., Ltd., Gyeonggi-do (KR)

(72) Inventors: Young Kyoo Kim, Seoul (KR); Sun Kee Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 15/185,403

(22) Filed: Jun. 17, 2016

(65) Prior Publication Data

US 2016/0371124 A1 Dec. 22, 2016

(30) Foreign Application Priority Data

Jun. 19, 2015 (KR) ........................ 10-2015-0087763

(51) Int. Cl.
*G06F 9/455* (2018.01)
*G06F 9/50* (2006.01)

(52) U.S. Cl.
CPC ........ *G06F 9/5038* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| 6,622,190 B1* | 9/2003 | Westerman | G06F 3/0481 710/244 |
| 2006/0136828 A1* | 6/2006 | Asano | G06F 3/1454 715/733 |
| 2010/0064251 A1* | 3/2010 | Hufnagel | G06F 3/0481 715/788 |
| 2011/0202936 A1* | 8/2011 | Todoroki | G06F 3/0481 719/329 |
| 2012/0263125 A1* | 10/2012 | Tejaswini | G06F 9/5011 370/329 |
| 2012/0276953 A1* | 11/2012 | Kim | H04M 1/72527 455/556.1 |
| 2012/0299814 A1* | 11/2012 | Kwon | H04M 1/72583 345/156 |
| 2012/0324197 A1* | 12/2012 | Spradlin | G06F 11/3604 711/170 |
| 2013/0009920 A1* | 1/2013 | Sim | G06F 3/147 345/204 |

(Continued)

FOREIGN PATENT DOCUMENTS

JP 2009176139 8/2009

*Primary Examiner* — Dong U Kim
(74) *Attorney, Agent, or Firm* — The Farrell Law Firm, P.C.

(57) ABSTRACT

An electronic device and method for operation of same are provided. The electronic device includes a display, a memory, and a processor configured to execute a first operating system, a second operating system and an application run on the second operating system. The processor displays an execution screen of the application on the display, compares, in response to an event that occurs on the first operating system, a priority of an event with a priority of the application, and maintains the execution screen of the application running on the second operating system if the priority of the application is higher than the priority of the event.

9 Claims, 9 Drawing Sheets

(56) References Cited

U.S. PATENT DOCUMENTS

| | | | |
|---|---|---|---|
| 2013/0219303 A1* | 8/2013 | Eriksson | G06F 3/1454 |
| | | | 715/759 |
| 2014/0223441 A1* | 8/2014 | Banda | G06F 9/48 |
| | | | 718/102 |
| 2014/0362768 A1 | 12/2014 | Wood et al. | |
| 2015/0058611 A1* | 2/2015 | Reeves | G06F 13/14 |
| | | | 713/1 |
| 2015/0193904 A1* | 7/2015 | Vermeulen | G06T 1/20 |
| | | | 345/522 |
| 2017/0308414 A1* | 10/2017 | Wu | G06F 9/541 |

\* cited by examiner

METHOD AND APPARATUS FOR CONTROLLING A PLURALITY OF OPERATING SYSTEMS

PRIORITY

This application claims priority under 35 U.S.C. § 119(a) to Korean Patent Application Serial number 10-2015-0087763, which was filed on Jun. 19, 2015 in the Korean Intellectual Property Office, the entire disclosure of which is incorporated herein by reference.

BACKGROUND

1. Field of the Disclosure

The present disclosure relates to controlling an electronic device that supports an environment for running a plurality of operating systems or platforms.

2. Description of the Related Art

Hypervisor technology is applied to desktops and laptops. Nowadays, hypervisor technology is also applied to mobile devices such as smartphones or tablets. The hypervisor represents a logical platform for running a plurality of operating systems (OSs) on an electronic device, and is referred to as a virtual machine monitor (VMM). Even though the hypervisor technology enables an electronic device to run two or more operating systems, a display of an electronic device such as a smartphone may provide a screen of one operating system.

As an example of an electronic device that supports the hypervisor, a smartphone which runs an Android operating system as a host operating system may allow installation of a Windows operating system as a guest operating system. In case when a Microsoft Office application (e.g., Excel) is executed while the Windows operating system is running, the display of the smartphone may only provide an execution screen of the Microsoft Office application. In other words, the Windows operating system may run in the foreground, and the Android operating system may run in the background.

As described above, when an event of a host operating system occurs while an application of a guest operating system is displayed, the guest operating system may be switched to the background and the host operating system may be switched to the foreground. For example, if an incoming call occurs on a user terminal while a user is doing paperwork using an Excel application on the Windows operating system, an operating system displayed on the display may be switched from the Windows operating system to the Android operating system since a call application of the Android operating system is executed. In some cases, important paperwork may be interrupted due to an unimportant call. In other words, a task which is considered as a high-priority task by the user may be interrupted by a relatively low-priority task.

SUMMARY

The present disclosure has been made to prevent user's inconvenience that may be caused due to unintended screen switch (switch of a running application/operating system) in order to solve the above-mentioned problem and achieve objects of the present disclosure.

Accordingly, an aspect of the present disclosure provides a device and method for providing an event/notification, etc. with respect to an event/notification, etc. occurring on a host operating system, without interrupting an execution state of an application running on a guest operating system.

In accordance with an aspect of the present disclosure, an electronic device is provided. The electronic device includes a display, a memory, and a processor configured to execute a first operating system, execute a second operating system and at least one application run on the second operating system, display an execution screen of the at least one application on the display, compare, in response to an event that occurs on the first operating system, a priority of an event with a priority of the at least one application, and maintain the execution screen of the at least one application running on the second operating system if the priority of the at least one application is higher than the priority of the event.

In accordance with another aspect of the present disclosure, a display method of an electronic device is provided that includes detecting an event occurring on a first operating system, obtaining a priority of an application running on a second operating system, the application being displayed on a display operatively connected to the electronic device, comparing a priority of the event with the priority of the application, and maintaining an execution screen of the application running on the second operating system if the priority of the application is higher than the priority of the event.

In accordance with another aspect of the present disclosure, a storage medium is provided for storing non-transient computer-readable instructions that, when executed by an electronic device, cause the electronic device to execute a first operating system, a second operating system, and at least one application run on the second operating system, display an execution screen of the at least one application on a display of the electronic device, compare a priority of an event with a priority of the at least one application if the event occurs on the first operating system, and maintain the execution screen of the at least one application running on the second operating system if the priority of the at least one application is higher than the priority of the event.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
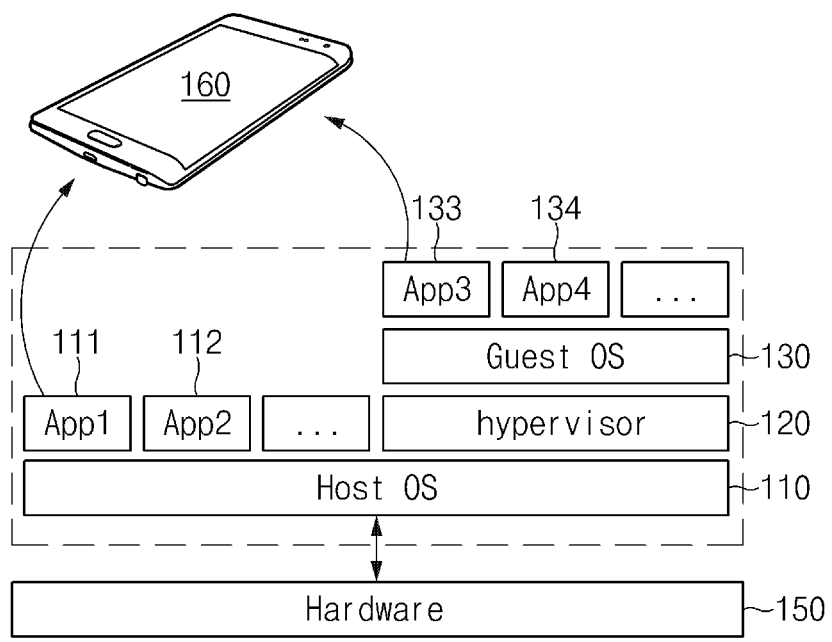
FIG. 1 illustrates an operational environment of an electronic device according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding description of the drawings, like reference numerals may refer to like elements.

The terms "have", "may have", "include", "may include", "comprise", or the like used herein indicate the existence of a corresponding feature (e.g., a number, a function, an operation, or an element) and do not exclude the existence of an additional feature.

The terms "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The terms "first", "second", or the like used herein may modify various elements regardless of the order and/or priority thereof, and are used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" used herein may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is only used to describe specific embodiments and is not intended to limit the scope of other embodiments. The terms of a singular form may include plural forms unless otherwise specified. The terms used herein, including technical or scientific terms, have the same meanings as understood by those skilled in the art. Terms defined in dictionaries, among the terms used herein, may be interpreted as having meanings that are the same as or similar to contextual meanings defined in the related art, and should not be interpreted in an idealized or overly formal sense unless otherwise defined explicitly. Depending on the situation, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HDM)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 illustrates an operational environment of an electronic device according to an embodiment of the present disclosure.

In various embodiments of the present disclosure, an electronic device may run a plurality of operating systems. In general, a hypervisor for running a plurality of operating systems is divided into two types. A hypervisor of type 1 (a native hypervisor or bare-metal hypervisor) is run directly on hardware of an electronic device (level 1), and a guest operating system is run in a second level on the hardware. In other words, a hypervisor which is directly run on hardware runs a plurality of operating systems.

A hypervisor of type 2 (a hosted hypervisor) is run on a host operating system like a typical program, and a guest operating system is run in a third level. In other words, a host operating system which is directly run on hardware runs a hypervisor, and a guest operating system is run on the hypervisor. The operational environment of the electronic device illustrated in FIG. 1 corresponds to the hypervisor or type 2. However, this is merely an example, and those skilled in the art could easily understand that various embodiments of the present disclosure are also applicable to the hypervisor of type 1.

In the following description, an Android operating system is described as an example of a host operating system, and a Windows operating system is described as an example of a guest operating system, but this is only intended for providing a description and does not limit the scope of the present disclosure. Herein, a host operating system and a guest operating system may be construed as a first operating system and a second operating system respectively, and the first and second operating systems may be the same in relationship (e.g., hypervisor of type 1) or may be dependent on each other (e.g., hypervisor of type 2). In some various embodiments of the present disclosure, a host operating system may be a Windows operating system, and a guest operating system may be an Android (or iOS, Symbian, or Tizen) operating system run on the Windows operating system.

According to an embodiment of the present disclosure, a host operating system 110 of an electronic device may be directly run on hardware 150. In other words, the host operating system 110 may be run in a first level. In an environment in which the host operating system 110 is run, a first application 111, a second application 112, and a hypervisor 120 may be executed. That is, the hypervisor 120 may be run in a second level. Then, a guest operating system 130 may be run on the hypervisor 120. In the example of FIG. 1, the guest operating system 130 may be run in a third level. A third application 133, a fourth application 134, etc. may be run on the guest operating system 130.

If the guest operating system 130 is run on the electronic device, and the third application 133 is executed, an execution screen of the third application 133 may be displayed on a display 160 of the electronic device. In this state, in case when the first application 111, which is run on the host operating system 110, is executed, or in case when an event of executing the first application 111 occurs, the electronic device may compare priority information assigned to the third application 133 with a priority of the first application 111 or the event, and may determine a screen to be output to the display 160 based on a result of comparison. A configuration of the electronic device and operation of the electronic device according to various embodiments of the present disclosure are described below with reference to FIGS. 2 to 9.

Figure 2:
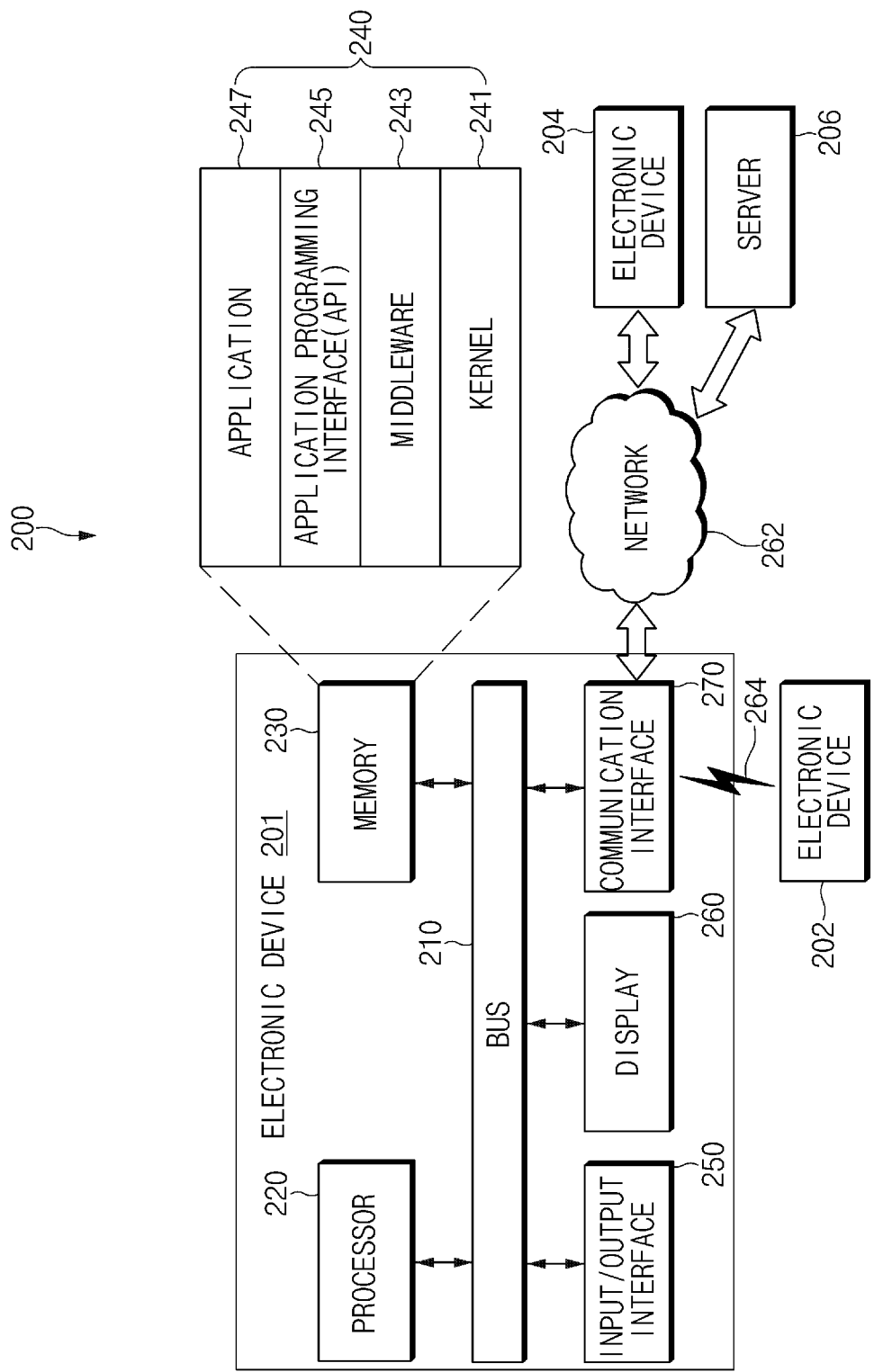
FIG. 2 illustrates an electronic device in a network environment according to an embodiment of the present disclosure.

FIG. 2 illustrates an electronic device in a network environment according to an embodiment of the present disclosure.

An electronic device 201 in a network environment 200 according to various embodiments of the present disclosure will be described with reference to FIG. 2. The electronic device 201 may include a bus 210, a processor 220, a memory 230, an input/output interface 250, a display 260, and a communication interface 270. In various embodiments of the present disclosure, at least one of the foregoing elements may be omitted or another element may be added to the electronic device 201.

The bus 210 may include a circuit for connecting the above-mentioned elements 210 to 270 to each other and transferring communications (e.g., control messages and/or data) among the above-mentioned elements.

The processor 220 may include at least one of a central processing unit (CPU), an application processor (AP), or a communication processor (CP). The processor 220 may perform data processing or an operation related to communication and/or control of at least one of the other elements of the electronic device 201.

The memory 230 may include a volatile memory and/or a nonvolatile memory. The memory 230 may store instructions or data related to at least one of the other elements of the electronic device 201. According to an embodiment of the present disclosure, the memory 230 may store software and/or a program 240. The program 240 may include, for example, a kernel 241, a middleware 243, an application programming interface (API) 245, and/or an application program (or an application) 247. At least a portion of the kernel 241, the middleware 243, or the API 245 may be referred to as an operating system (OS).

The kernel 241 may control or manage system resources (e.g., the bus 210, the processor 220, the memory 230, or the like) used to perform operations or functions of other programs (e.g., the middleware 243, the API 245, or the application program 247). Furthermore, the kernel 241 may provide an interface for allowing the middleware 243, the API 245, or the application program 247 to access individual elements of the electronic device 201 in order to control or manage the system resources.

The middleware 243 may serve as an intermediary so that the API 245 or the application program 247 communicates and exchanges data with the kernel 241.

Furthermore, the middleware 243 may handle one or more task requests received from the application program 247 according to a priority order. For example, the middleware 243 may assign at least one application program 247 a priority for using the system resources (e.g., the bus 210, the processor 220, the memory 230, or the like) of the electronic device 201. For example, the middleware 243 may handle the one or more task requests according to the priority assigned to the at least one application, thereby performing scheduling or load balancing with respect to the one or more task requests.

The API 245, which is an interface for allowing the application 247 to control a function provided by the kernel 241 or the middleware 243, may include, for example, at least one interface or function (e.g., instructions) for file control, window control, image processing, character control, or the like.

The input/output interface 250 may serve to transfer an instruction or data input from a user or another external device to (an)other element(s) of the electronic device 201. Furthermore, the input/output interface 250 may output instructions or data received from (an)other element(s) of the electronic device 201 to the user or another external device.

The display 260 may include, for example, a liquid crystal display (LCD), a light-emitting diode (LED) display, an organic light-emitting diode (OLED) display, a microelectromechanical systems (MEMS) display, or an electronic paper display. The display 260 may present various content (e.g., a text, an image, a video, an icon, a symbol, or the like) to the user. The display 260 may include a touch screen, and may receive a touch, gesture, proximity or hovering input from an electronic pen or a part of a body of the user.

The communication interface 270 may set communications between the electronic device 201 and an external device (e.g., a first external electronic device 202, a second external electronic device 204, or a server 206). For example, the communication interface 270 may be connected to a network 262 via wireless communications or wired communications so as to communicate with the external device (e.g., the second external electronic device 204 or the server 206).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 264. The short-range communications may include at least one of wireless fidelity (Wi-Fi), Bluetooth, near field communication (NFC), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 262 may include at least one of telecommunications networks, for example, a computer network (e.g., a LAN or WAN), the Internet, or a telephone network.

The types of the first and second external electronic devices 202 and 204 may be the same as or different from the type of the electronic device 201. According to an embodiment of the present disclosure, the server 206 may include a group of one or more servers. A portion or all of operations performed in the electronic device 201 may be performed in one or more other electronic devices (e.g., the first or second external electronic device 202 or 204 or the server 206). When the electronic device 201 should perform a certain function or service automatically or in response to a request, the electronic device 201 may request at least a portion of functions related to the function or service from another device (e.g., the first or second external electronic device 202 or 204 or the server 206) instead of or in addition to performing the function or service for itself. The other electronic device (e.g., the first or second external electronic device 202 or 204 or the server 206) may perform the requested function or additional function, and may transfer a result of the performance to the electronic device 201. The electronic device 201 may use a received result itself or additionally process the received result to provide the requested function or service. To this end, for example, a cloud computing technology, a distributed computing technology, or a client-server computing technology may be used.

Figure 3:
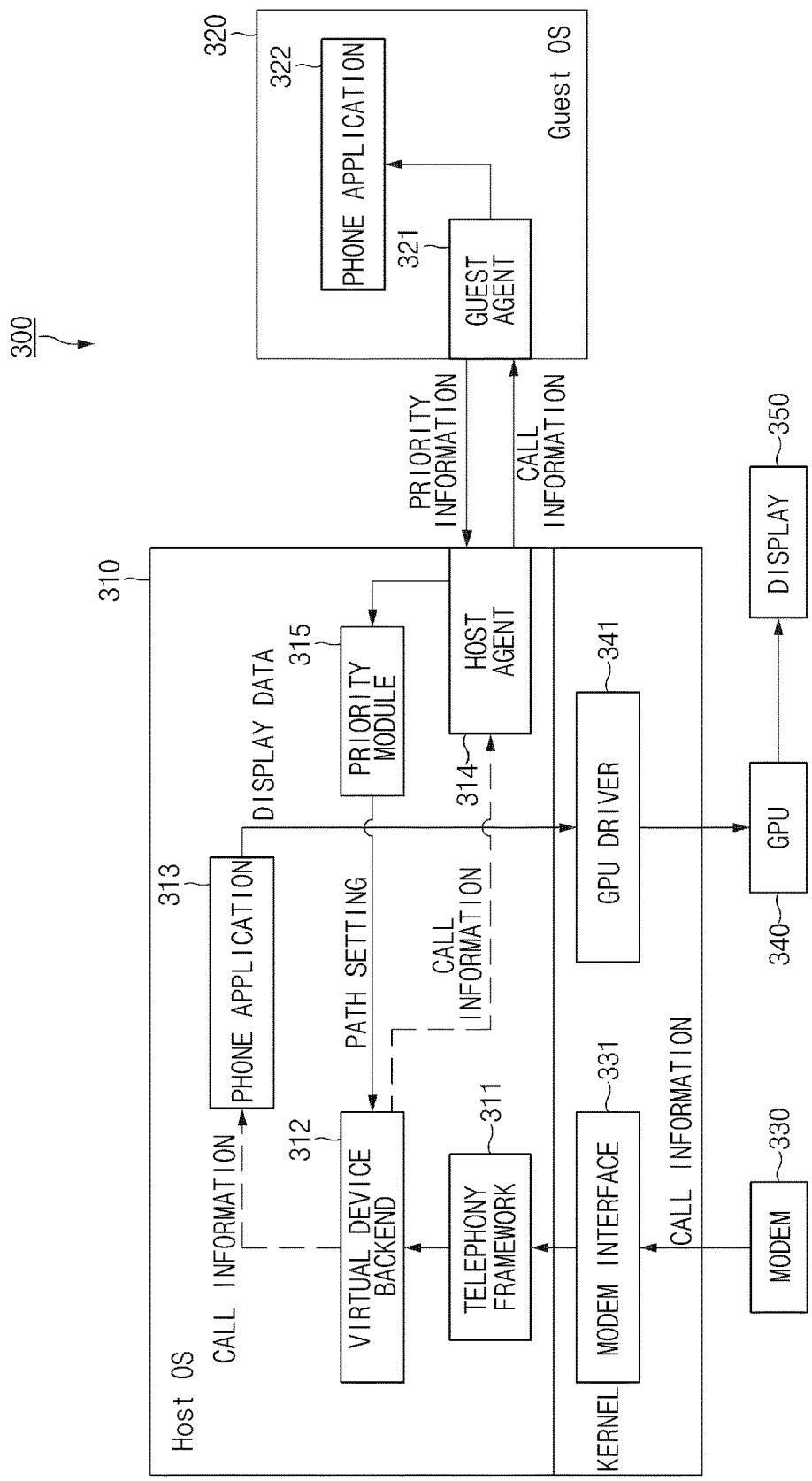
FIG. 3 illustrates flow of data/information for providing a notification according to an embodiment of the present disclosure.

FIG. 3 illustrates a flow of data/information for providing a notification of an electronic device according to an embodiment of the present disclosure.

The embodiment of FIG. 3 may correspond to an example in which an application of a guest operating system 320 is run in the foreground while a host operating system 310 is run in the background. For example, an execution screen of an application with a high priority of the guest operating system 320 may be output to a display 350 of an electronic device 300. For example, a video playback application, a video/program encoding application, or an application for which an interruption (e.g., screen switching) by an event or another application is not desired may be running.

In one embodiment of the present disclosure, an interrupt such as an incoming call may occur on the electronic device 300, and hardware and software (e.g., the program 240) may perform an operation corresponding to the interrupt. For example, a modem 330 may transfer information (e.g., call information) on the incoming call to a framework 311 (e.g., a telephony framework) via a modem interface 331 of a kernel. Here, the modem 330 may correspond to a type of a communication module capable of performing a call function via a cellular network such as a 2G/3G or LTE network.

According to an embodiment of the present disclosure, in order to prevent an interrupt or related information from being directly transferred to the guest operating system 320, an end module such as a virtual device backend 312 may handle and control an occurring interrupt.

In detail, a host agent 314 of the host operating system 310 may obtain, from a guest agent 321 of the guest operating system 320, priority information of a currently operating application (e.g., an application currently being output to the display 260 of the electronic device 201). The host agent 314 may provide the obtained priority information to a priority module 315, and the priority module 315 may compare a priority of a currently occurring event with a priority of an application which is running on the guest operating system 320. The priority module 315 may set, based on a result of comparison, a target (path) to which the virtual device backend 312 is to transfer event information.

For example, in case when the priority of the application which is being output to the display 350 is higher, the priority module 315 may transfer the information on the incoming call to the host agent 314. The host agent 314 may transfer the received information on the incoming call to the guest agent 321, and the guest operating system 320 may provide a notification on event occurrence using an application (e.g., a phone application 322 of the guest operating system 320) corresponding to an event. In another embodiment of the present disclosure, the guest operating system 320 may not provide the notification on event occurrence, or may provide the notification on event occurrence after an application that is currently running is ended. An example of receiving and providing event information by the guest operating system 320 may be variously modified according to a setting of the guest operating system 320 or the electronic device 300. However, in the above-mentioned examples, an operating system output to the display 350 may be maintained as the guest operating system 320.

For another example, in case when the priority of the application which is running on the guest operating system 320 is lower, the priority module 315 may transfer the information on the incoming call to a phone application 313 of the host operating system 310. The phone application 313 may transfer, to a GPU driver 341 (or a graphics driver) of the kernel, display data based on the information on the incoming call. The display data may be transferred to a GPU 340, and the GPU 340 may output, to the display 350, an execution screen of the phone application 313. In this case, an operating system output to the display 350 may be switched from the guest operating system 320 to the host operating system 310.

Figure 4:
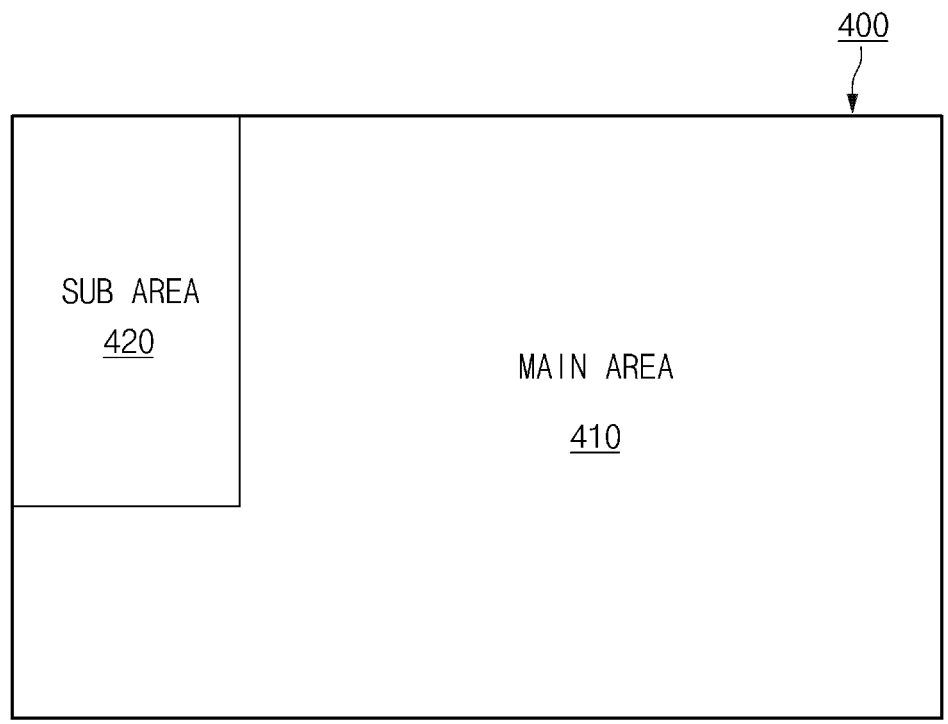
FIG. 4 illustrates providing a display on a guest operating system according to an embodiment of the present disclosure.

FIG. 4 illustrates an example of providing a guest operating system according to an embodiment of the present disclosure.

The example of FIG. 4, for example, may correspond to an embodiment in which an operating system output to the display 350 of FIG. 3 is maintained as the guest operating system 320. For example, an execution screen of the guest operating system 320 may be output to a full screen 400 or a main area 410. If an event occurs on the host operating system 310, and event information is transferred through the guest agent 321, a processor (e.g. the processor 210) of the electronic device 300 may cause the guest operating system 320 to output, to a sub area 420, a screen corresponding the event, without launching an application of the host operating system 310. For example, the guest operating system 320 may display an event-related UI on the sub area 420, or may launch an application (e.g., a phone application for a Windows operating system) of the guest operating system 320 corresponding to the event in the sub area 420. The event-related UI may be determined based on a notification display method (e.g., popup, notification balloon, notification bar, sound, vibration, lamp, etc.) provided by the guest operating system 320.

Figure 5:
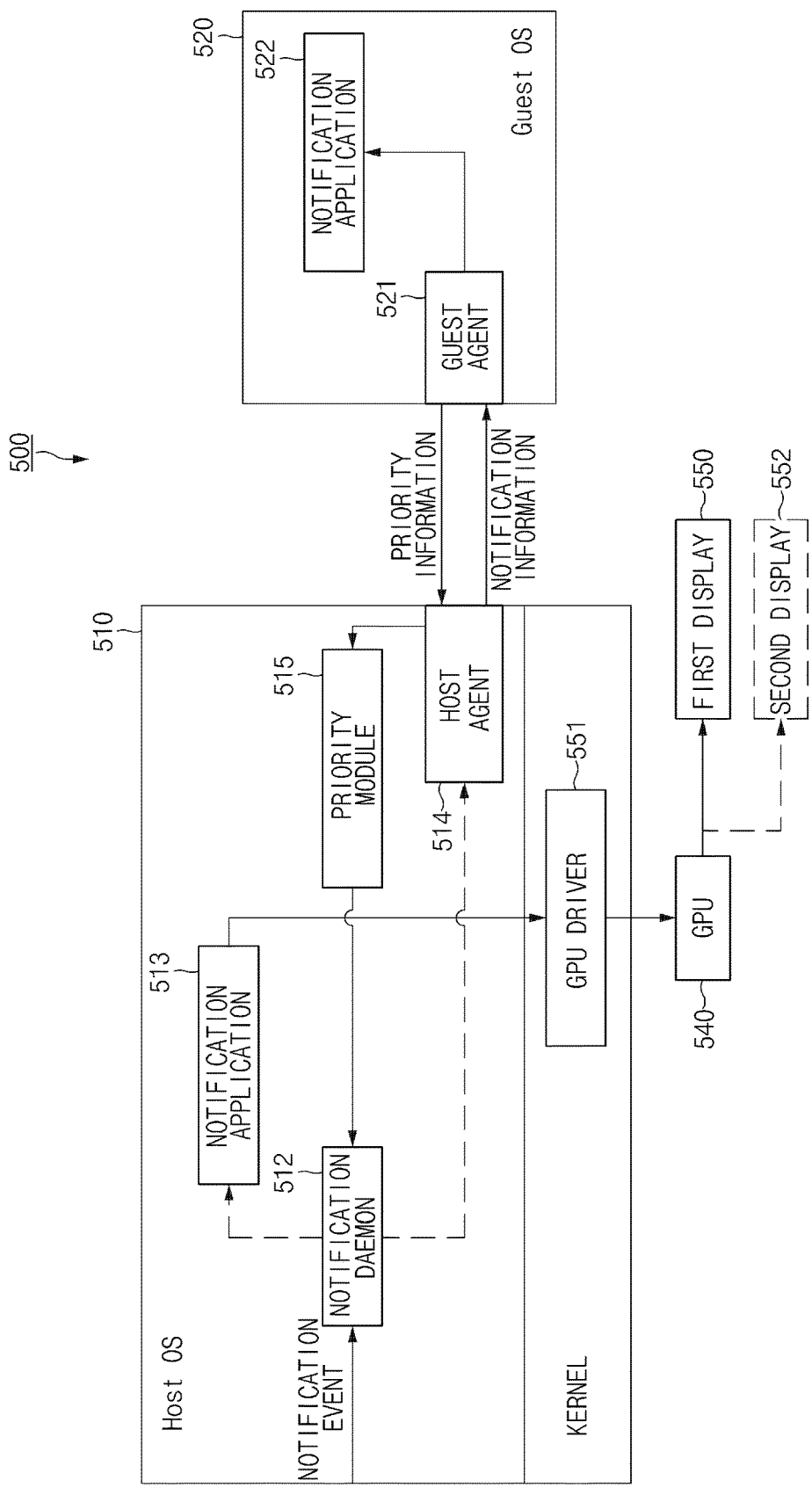
FIG. 5 illustrates flow of data/information for providing a notification according to another embodiment of the present disclosure.

FIG. 5 illustrates a flow of data/information for providing a notification of an electronic device according to another embodiment of the present disclosure.

FIG. 5 illustrates a flow of data/information for providing a notification when a notification event occurs in an electronic device 500. A notification event may occur due to a user setting or operation of an application in the electronic device 500 besides the embodiment of FIG. 3. However, the embodiment of FIG. 5 should be understood from an aspect of a supplement to the embodiment of FIG. 3, and should not be construed as being limited to a case in which an event occurs outside the electronic device 300. For example, an event such as the incoming call illustrated in FIG. 3 should be handled such that an operation of a phone application is output to the display 350 by a user's immediate response (e.g., acceptance), but, for an event such as reception of an instant message or e-mail, download completion, or normal notification by an internal application, it may be sufficient to provide only a vibration or sound notification or provide notification information (e.g., intent information of Android) to a portion of a screen (e.g., a notification bar at the top of the screen). Descriptions which overlap with, or correspond to or are similar to the above descriptions of FIG. 3 or 4 may not be provided below.

If an event occurs, a notification daemon 512 may handle and control an interrupt corresponding to the event. The notification daemon 512, which is a type of an end module, may correspond to the backend 312 of FIG. 3.

The notification daemon 512 may determine, based on path setting information received from a priority module 515, whether to transfer a notification event to a guest operating system 520 or whether the notification event should be directly handled by a notification application 513 of a host operating system 510.

A host agent 514 may obtain, from a guest agent 521, information on a priority of an application that is currently running, i.e., being displayed, on the guest operating system 520, and may transfer the information to the priority module 515. The priority module 515 may transfer, to the notification daemon 512, a message of determining a target, i.e., path, to which information on the notification event is to be transferred. For example, in case when the priority of the application which is being output to a display 550 is higher, the priority module 515 may transfer the information on the notification event to the guest agent 521 via the host agent 514. The guest operating system 520 or a notification application 522 of the guest operating system 520 may output a notification based on the obtained information on the notification event. In this case, an operating system output to the display 550 may be maintained as the guest operating system 520.

A notification based on event information may be provided variously. For example, the guest operating system 520 may display at least a part of the information, or may display an icon corresponding to the information. The guest operating system 520 may display at least a part of the information with a predetermined level of transparency (e.g., semi-transparently). Furthermore, according to an embodiment of the present disclosure, the notification may be output so that the notification may not overlie content that is running on the guest operating system 520. For example, the guest operating system 520 may detect a content area of a current execution screen to which an image or a text is output, and may set an area other than the content area as a notification area (e.g., the sub area 420). For example, the notification may be displayed on an empty screen (e.g., an empty space of a webpage, a spreadsheet, a word processor, or the like) of an application that is running on the guest operating system 520.

For another example, in case when the priority of the application which is running on the guest operating system 520 is lower, the priority module 515 may transfer the information on the notification event to the notification application 513 of the host operating system 510. The notification application 513 may transfer display data based on the information on the notification event to a GPU 540 via a GPU driver 551 of the kernel. The GPU 540 may output, to the display 550, a notification message or an execution screen of the notification application 513.

In one embodiment of the present disclosure, the electronic device 500 may be provided with a plurality of displays, or may include display areas operatively separated from each other. For example, the electronic device 500 may include front and rear displays or front and side displays. In one embodiment of the present disclosure, the electronic device 500 may include a side display extending from one side of a front display and having a curved shape. A front display, a main display, or a flat display (or a display area) may correspond to the first display 550, and a rear/side display, a sub display, or a curved display (or a display area) may correspond to a second display 552. At least one of the plurality of displays may be set as a separate display for a notification. For example, the second display 552 may be set as a display device (area) for a notification. In one embodiment of the present disclosure, the first display 550 may be used to display an execution screen of the guest operating system 520, and the second display 552 may be used to provide a notification of the host operating system 510 and/or the guest operating system 520. For example, if an event or interrupt of the host operating system 510 occurs while the guest operating system 520 is used, a notification may be output to, for example, the second display 552 specified via an application or a UI framework of the host operating system 510.

In one embodiment of the present disclosure, the second display 552 may correspond to another external device (e.g., a wearable device, a monitor, a TV, or the like) operatively connected to the electronic device 500. An external device provided with the second display 552 may be connected via short-range communications such as BT, Wi-Fi, Wi-Fi Direct, NFC, or the like or a cellular network. If an event or interrupt of the host operating system 510 occurs while an execution screen of the guest operating system 520 is displayed on the first display 550, the electronic device 500 (or the host operating system 510) may provide information on the event or interrupt to the external device. Upon receiving the information on the event or interrupt, the external device may output a notification to the second display 552.

Figure 6:
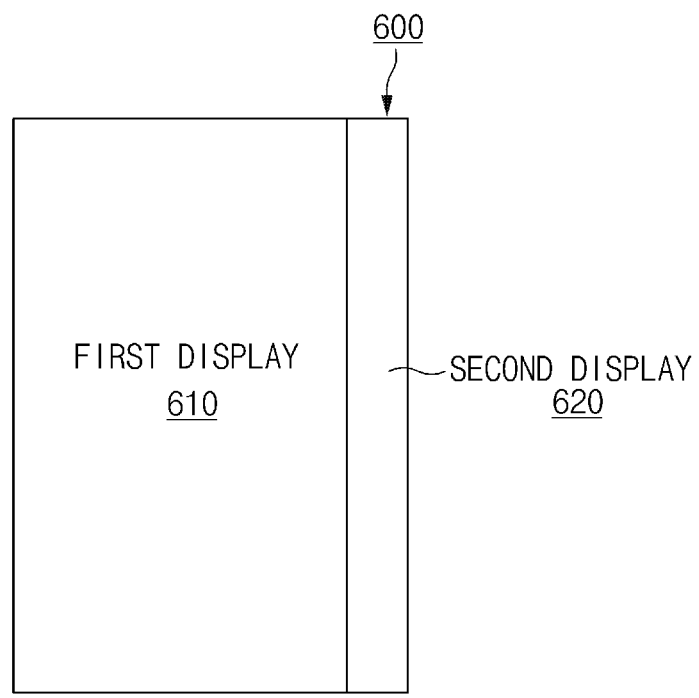
FIG. 6 illustrates providing a display on a guest operating system according to another embodiment of the present disclosure.

FIG. 6 illustrates an example of providing a display on a guest operating system according to another embodiment of the present disclosure.

The example of FIG. 6 may correspond to an embodiment in which execution of an application and provision of a notification are performed using the first and second displays 550 and 552 of FIG. 5. A first display 610 may correspond to the first display 550, and a second display 620 may correspond to the second display 552. This display configuration is merely an example, and various types of multiple displays may be applied. Even in case when an electronic device includes only one display, a display 600 may be divided into a main area 610 (e.g., the main area 410 of FIG. 4) and a sub area 620 (e.g., the sub area 420 of FIG. 4), and a notification may be provided to the area 620.

In one embodiment of the present disclosure, an execution screen of a second operating system (e.g., the guest operating system 520) may be output to the first display 610. In this case, state information (e.g., time, remaining battery capacity, Wi-Fi connectivity, GPS connection state, or the like) of the first operating system (e.g., the host operating system 510) may be output to the second display 620, or at least a part of a screen of an application of the second operating system 520 may be output to the second display 620.

Here, if an event occurs on the first operating system, the first operating system may output notification information to the second display 620 by obtaining a right to control the second display 620 or using a control right already owned. If a priority of the event is higher than that of an application which is running on the second operating system, a screen output to the first display 610 may be switched from a screen of the second operating system to a screen of the first operating system.

A priority of an application and handling of an event or interrupt according to a priority may be predefined. For example, priorities of applications may be grouped. For example, a priority of an application which is running on the guest operating system 520 may belong to a second priority group, and a priority of an event which occurs on the host operating system 510 may belong to any one of first to third priority groups. When the priority of the event corresponds to a third priority, an operating system output to the display 550 may be maintained as the guest operating system 520 (e.g., first operation). If the priority of the event corresponds to a second priority and thus belongs to the same priority group as the currently running application, the electronic device 500 may perform a predefined second operation (e.g., transferring a notification event to the guest operating system 520 while maintaining an application running state of the guest operating system 520). If the event that has occurred belongs to the first priority group, an operating system output to the display 550 may be switched into the host operating system 510 (e.g., third operation).

For another example, priorities of applications may be assigned scores or numbers or may be relatively determined without being grouped. For example, the priorities may be dynamically determined based on a user's context. For example, in case when the user uses a burst function/option for a specific function, a priority of a corresponding application may be set to be high (e.g., highest priority). Furthermore, even identical events may be assigned different priorities according to not only a priority of a currently running function/application but also details (e.g., phone caller, message sender, message contents, etc.) of an event/interrupt that has occurred. For example, in case when a call event occurs on the host operating system 510 while a specific application is running on the guest operating system 520, only a notification may be provided without switching an operating system in normal situations, but, if the call event is an emergency call or is a call from a specified caller, a screen may be switched into the host operating system 510.

Furthermore, the electronic device may obtain schedule or current location (e.g., a conference room, a restaurant, or the like) information of the user, and may change a priority of a running application according to a situation. For example, at a time for which a meeting schedule is set, a priority related to a meeting may be set to be high. In detail, if an operation (e.g., reception of an e-mail related to a meeting) related to a meeting occurs on the host operating system 510 while an application (e.g., a game) unrelated to a meeting is running on the guest operating system 520, a screen output to a display may be switched into an execution screen of the host operating system 510. For another example, in case when a current location of the user corresponds to a restaurant, a priority of a popup (e.g., beacon) related to food may be set to be high.

Furthermore, in one embodiment of the present disclosure, a priority of an application may be set by the user. For example, in case when a specific application is run on the guest operating system 520, a screen switch lock may be set for the application by an input from the user. In this case, the application may be construed as being assigned a highest priority. In other words, in case when the application for which the screen switch lock is set is running, an operating system output to a display may not be switched into another operating system even if a call or any other notification event occurs. Likewise, an application may be set by an input from the user so that a screen switch is performed when an event occurs on the host operating system 510.

Figure 7:
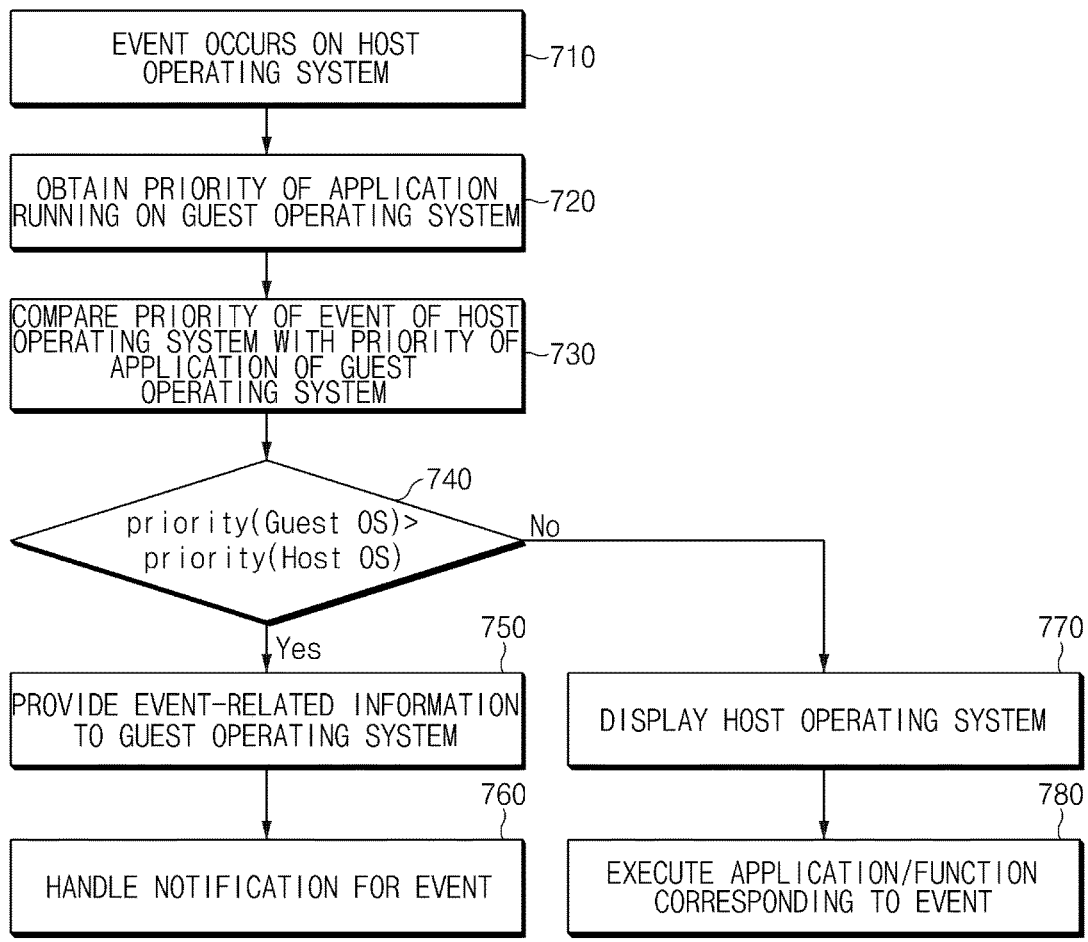
FIG. 7 is a flowchart illustrating a method for providing a notification in an environment in which two operating systems are run according to an embodiment of the present disclosure.

FIG. 7 is a flowchart illustrating a method for providing a notification in an environment in which two operating systems are run according to an embodiment of the present disclosure.

The embodiment of FIG. 7, for example, may be applied to an electronic device in which at least one of a host operating system or a guest operating system is run on a hypervisor and an application of the host operating system is running.

In operation 710, an event may occur on a host operating system. For example, an event of an incoming call received from the outside or any other notification event may occur. This event may be temporarily handled by an end module (e.g., the virtual device backend 312 or the notification daemon 512) so that a screen switch (operating system switch) is not forced.

In operation 720, the electronic device may obtain a priority of an application which is running on the guest operating system. This operation may be performed by agents provided to the host operating system and the guest operating system.

In operation 730, the electronic device may compare a priority of the event occurring on the host operating system with the priority of the application which is running on the guest operating system. Although it has been described with reference to FIG. 3 or 5 that a priority module compares priorities, this is merely an example, and a processor (e.g., the processor 210) of the electronic device may compare priorities via an appropriate hardware/software module.

If the priority of the guest operating system is higher as a result of comparison in operation 740, the electronic device may perform operation 750. If the priority of the guest operating system is not higher as the result of comparison, the electronic device may perform operation 770.

In operation 750, the electronic device may provide event-related information to the guest operating system. That is, the electronic device simply transfers the event-related information to the guest operating system, without switching an operating system output to a display (or a main display) of the electronic device. In operation 760, the electronic device (the guest operating system of the electronic device) may handle a notification for the event received. For example, the electronic device may provide the notification of the event to a predetermined area, or may execute an application of the guest operating system corresponding to the event on the predetermined area.

In operation 770, the electronic device may display the host operating system. In operation 780, the electronic device may execute an application or a function of the host operating system corresponding to the event. For example, in case when an incoming call event occurs, the application of the guest operating system may be switched to the background, and a phone application of the host operating system may be switched to the foreground and may be displayed on the display of the electronic device. In this case, if the application corresponding to the event is ended, the electronic device may switch the host operating system back to the background, and may switch an execution screen of the application of the guest operating system to the foreground. In another embodiment of the present disclosure, the electronic device may maintain the host operating system in the foreground after the application is ended.

Figure 8:
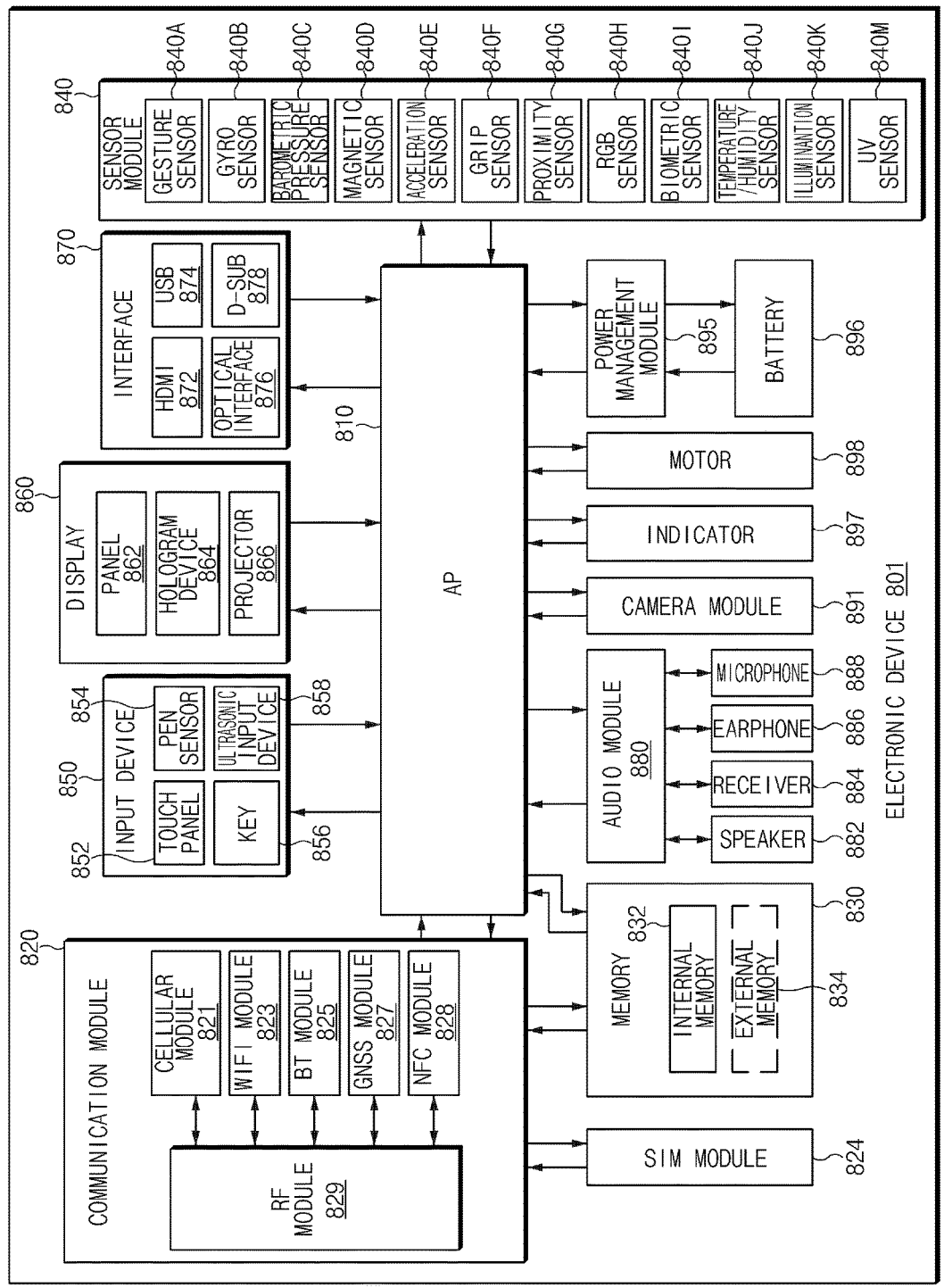
FIG. 8 is a block diagram illustrating an electronic device according to an embodiment of the present disclosure.

FIG. 8 is a block diagram illustrating an electronic device according to an embodiment of the present disclosure.

Referring to FIG. 8, an electronic device 801 may include, for example, a part or the entirety of the electronic device 201 illustrated in FIG. 2. The electronic device 801 may include at least one processor (e.g., AP) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may run an operating system or an application program so as to control a plurality of hardware or software elements connected to the processor 810, and may process various data and perform operations. The processor 810 may be implemented with, for example, a system on chip (SoC). According to an embodiment of the present disclosure, the processor 810 may further include a graphic processing unit (GPU) and/or an image signal processor. The processor 810 may include at least a portion (e.g., a cellular module 821) of the elements illustrated in FIG. 8. The processor 810 may load, on a volatile memory, an instruction or data received from at least one of other elements (e.g., a nonvolatile memory) to process the instruction or data, and may store various data in a nonvolatile memory.

The communication module 820 may have a configuration that is the same as or similar to that of the communication interface 270 of FIG. 2. The communication module 820 may include, for example, a cellular module 821 (e.g., the modem 330), a Wi-Fi module 823, a Bluetooth module 825, a GNSS module 827 (e.g., a GPS module, a GLONASS module, a BeiDou module, or a Galileo module), an NFC module 828, and a radio frequency (RF) module 829.

The cellular module 821 may provide, for example, a voice call service, a video call service, a text message service, or an Internet service through a communication network. The cellular module 821 may identify and authenticate the electronic device 801 in the communication network using the subscriber identification module 824 (e.g., a SIM card). The cellular module 821 may perform at least part of functions that may be provided by the processor 810. The cellular module 821 may include a communication processor (CP).

Each of the Wi-Fi module 823, the Bluetooth module 825, the GNSS module 827 and the NFC module 828 may include, for example, a processor for processing data transmitted/received through the modules. According to some various embodiments of the present disclosure, at least a part (e.g., two or more) of the cellular module 821, the Wi-Fi module 823, the Bluetooth module 825, the GNSS module 827, and the NFC module 828 may be included in a single integrated chip (IC) or IC package.

The RF module 829 may transmit/receive, for example, communication signals (e.g., RF signals). The RF module 829 may include, for example, a transceiver, a power amp module (PAM), a frequency filter, a low noise amplifier (LNA), an antenna, or the like. According to another embodiment of the present disclosure, at least one of the cellular module 821, the Wi-Fi module 823, the Bluetooth module 825, the GNSS module 827, or the NFC module 828 may transmit/receive RF signals through a separate RF module.

The SIM 824 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 830 (e.g., the memory 230) may include, for example, an internal memory 832 or an external memory 834. The internal memory 832 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 834 may include a flash drive such as a compact flash (CF), a secure digital (SD), a Micro-SD, a Mini-SD, an extreme digital (xD), a MultiMediaCard (MMC), a memory stick, or the like. The external memory 834 may be operatively and/or physically connected to the electronic device 801 through various interfaces.

The sensor module 840 may, for example, measure physical quantity or detect an operation state of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 840 may further include a control circuit for controlling at least one sensor included therein. In some various embodiments of the present disclosure, the electronic device 801 may further include a processor configured to control the sensor module 840 as a part of the processor 810 or separately, so that the sensor module 840 is controlled while the processor 810 is in a sleep state.

The input device 850 may include, for example, a touch panel 852, a (digital) pen sensor 854, a key 856, or an ultrasonic input device 858. The touch panel 852 may employ at least one of capacitive, resistive, infrared, and ultraviolet sensing methods. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone 888 so as to identify data corresponding to the ultrasonic waves sensed.

The display 860 (e.g., the display 260) may include a panel 862, a hologram device 864, or a projector 866. The panel 862 may have a configuration that is the same as or similar to that of the display 260 of FIG. 2. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, or a D-subminiature (D-sub) 878. The interface 870, for example, may be included in the communication interface 270 illustrated in FIG. 2. Additionally or alternatively, the interface 870 may include, for example, a mobile high-definition link (MHL) interface, an SD card/multi-media card (MMC) interface, or an infrared data association (IrDA) interface.

The audio module 880 may convert, for example, a sound into an electrical signal or vice versa. At least a portion of elements of the audio module 880 may be included in the input/output interface 250 illustrated in FIG. 2. The audio module 880 may process sound information input or output through a speaker 882, a receiver 884, an earphone 886, or the microphone 888.

The camera module 891 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 895 may manage power of the electronic device 801. According to an embodiment of the present disclosure, the power management module 895 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), mediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 9:
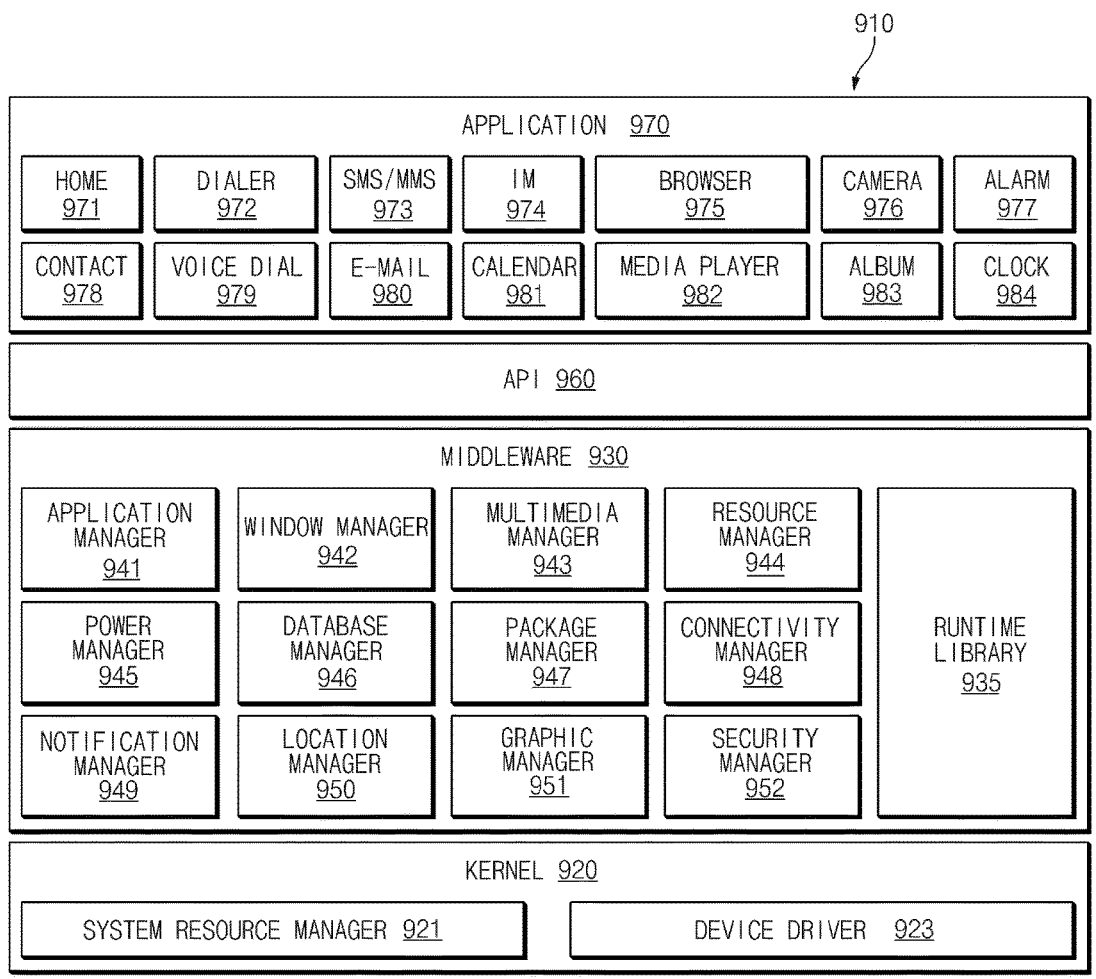
FIG. 9 is a block diagram illustrating a program module according to an embodiment of the present disclosure.

FIG. 9 is a block diagram illustrating a program module according to an embodiment of the present disclosure.

Referring to FIG. 9, a program module 910 (e.g., the program 240) may include an operating system (OS) for controlling a resource related to an electronic device (e.g., the electronic device 201) and/or various applications (e.g., the application program 247) running on the OS. The operating system may be, for example, Android, iOS, Windows, Symbian, Tizen, or the like.

The program module 910 may include a kernel 920, a middleware 930, an API 960, and/or an application 970. At least a part of the program module 910 may be preloaded on an electronic device or may be downloaded from an external electronic device (e.g., the electronic device 202 or 204 or the server 206).

The kernel 920 (e.g., the kernel 241) may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 so that the applications 970 may efficiently use limited system resources in the electronic device. According to an embodiment of the present disclosure, the middleware 930 (e.g., the middleware 243) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include, for example, a library module that a complier uses to add a new function through a programming language while the application 970 is running. The runtime library 935 may perform a function for input/output management, memory management, or an arithmetic function.

The application manager 941 may mange, for example, a life cycle of at least one of the applications 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the applications 970.

The power manager 945, for example, may operate together with a basic input/output system (BIOS) to manage a battery or power and may provide power information required for operating the electronic device. The database manager 946 may generate, search, or modify a database to be used in at least one of the applications 970. The package manager 947 may manage installation or update of an application distributed in a package file format.

The connectivity manger 948 may manage wireless connection of Wi-Fi, Bluetooth, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case in which an electronic device (e.g., the electronic device 201) includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an operating system to provide differentiated functions. Furthermore, the middleware 930 may delete a part of existing elements or may add new elements dynamically.

The API 960 (e.g., the API 245) which is, for example, a set of API programming functions may be provided in different configurations according to an operating system. For example, in the case of Android or iOS, one API set may be provided for each platform, and, in the case of Tizen, at least two API sets may be provided for each platform.

The application 970 (e.g., the application program 247), for example, may include at least one application capable of performing functions such as a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a clock 984, health care (e.g., measure an exercise amount or blood sugar), or environmental information provision (e.g., provide air pressure, humidity, or temperature information).

According to an embodiment of the present disclosure, the application 970 may include an information exchange application for supporting information exchange between the electronic device (e.g., the electronic device 201) and an external electronic device (e.g., the electronic device 202 or 204). The information exchange application may include, for example, a notification relay application for relaying specific information to the external electronic device or a device management application for managing the external electronic device.

For example, the notification relay application may have a function for relaying, to an external electronic device (e.g., the electronic device 202 or 204), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the electronic device 202 or 204) communicating with the electronic device, an application running in the external electronic device, or a service (e.g., a call service, a message service, or the like) provided from the external electronic device.

According to an embodiment of the present disclosure, the application 970 may include a specified application (e.g., a healthcare application of a mobile medical device) according to an attribute of the external electronic device (e.g., the electronic device 202 or 204). The application 970 may include an application received from an external electronic device (e.g., the server 206 or the electronic device 202 or 204). The application 970 may include a preloaded application or a third-party application downloadable from a server. The names of the elements of the program module 910 illustrated may vary with the type of an operating system.

According to various embodiments of the present disclosure, at least a part of the program module 910 may be implemented with software, firmware, hardware, or a combination thereof. At least a part of the program module 910, for example, may be implemented (e.g., executed) by a processor (e.g., the processor 810). At least a part of the program module 910 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 220), the processor may perform functions corresponding to the instructions. The computer-readable storage medium may be, for example, the memory 230.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor. For example, the memory may include instructions that, when executed by the processor, cause the processor to execute a first operating system, a second operating system, and at least one application run on the second operating system, display an execution screen of the application on a display of the electronic device, compare a priority of an event with a priority of the application if the event occurs on the first operating system, and continue to display, on the display, the execution screen of the application running on the second operating system if the priority of the application is higher.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to embodiments of the present disclosure, in an electronic device supporting a heterogeneous operating system environment, a screen switch which is not desired by a user may be prevented from occurring due to events that occur on different operating systems, and a notification may be provided without interrupting a currently operating application.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a display;
a memory comprising a first operating system and a second operating system, wherein the second operating system is configured to run on a hypervisor, and wherein the hypervisor is configured to run on the first operating system; and
a processor configured to:
execute the first operating system in a background and execute the second operating system in a foreground;
through the second operating system, display an execution screen of at least one application on the display;
through the first operating system, detect an event that occurs on the first operating system while the execution screen of the at least one application is displayed;
provide priority of the at least one application from the second operating system to the first operating system; and
through the first operating system, compare a priority of the event with the priority of the at least one application;
determine the priority of the at least one application is higher than the priority of the event;
provide information related to the event from the first operating system to the second operating system;
through the second operating system, display a notification of the event based on the information while the execution screen of the at least one application is displayed on the display,
determine the priority of the at least one application is lower than the priority of the event,
switch the foreground from the second operating system to the first operating system; and
through the first operating system, display, on the display, an execution screen of an application corresponding to the event.

2. The electronic device of claim 1,
wherein the display comprises a main area and a sub area, and
wherein the notification for the event is displayed on the sub area.

3. The electronic device of claim 1, wherein the priority of the at least one application is set by a user.

4. The electronic device of claim 1,
wherein the display comprises a first display and a second display,
wherein the execution screen of the at least one application is displayed on the first display, and
wherein a notification screen for the event occurring on the first operating system is displayed on the second display.

5. The electronic device of claim 1, further comprising:
a modem, wherein the processor is further configured to detect the event when an incoming call is received via the modem.

6. A display method of an electronic device, comprising:
executing a host operating system in a background and executing a guest operating system in a foreground;
through the guest operating system, displaying an execution screen of an application;
through a first operating system, detecting an event occurring on the first operating system while the execution screen of the application is displayed;
providing a priority of the application from a second operating system to the first operating system;
through the first operating system, comparing a priority of the event with the priority of the application;
determining the priority of the application is higher than the priority of the event;
providing information related to the event from the first operating system to the second operating system;
through the second operating system, displaying a notification of the event based on the information while the execution screen of the application is displayed;
determining the priority of the application is lower than the priority of the event;
switching the foreground from the second operating system to the first operating system; and
through the first operating system, displaying an execution screen of an application corresponding to the event.

7. The display method of claim 6, wherein displaying the notification comprises one of:
displaying at least a part of the information related to the event;
displaying an icon corresponding to the information related to the event; and
semi-transparently displaying at least a part of the information related to the event.

8. The display method of claim 6, wherein comparing the priority of the event with the priority of the application is based on at least one of contents of the event, a location of the electronic device, and an activity of a user of the electronic device.

9. The display method of claim 6,
wherein the electronic device comprises an additional display different from the display to which the execution screen of the application is maintained, and
the display method further comprises:
displaying a notification for the event on the additional display.

* * * * *